United States Patent [19]

Sasaki et al.

[11] Patent Number: 4,968,159
[45] Date of Patent: Nov. 6, 1990

[54] PRINTING APPARATUS THAT ADAPTS TO HOST COMPUTER'S OPERATION MODE

[75] Inventors: Ichiro Sasaki, Nagoya; Naoyuki Hatta, Gamagori, both of Japan

[73] Assignee: Brother Kogyo Kabushiki Kaisha, Aich, Japan

[21] Appl. No.: 425,343

[22] Filed: Oct. 17, 1989

Related U.S. Application Data

[63] Continuation of Ser. No. 163,610, Mar. 13, 1988, abandoned.

[30] Foreign Application Priority Data

Mar. 4, 1987 [JP] Japan .................... 62-49492

[51] Int. Cl.5 ............................. B41J 11/42
[52] U.S. Cl. ...................... 400/76; 400/61; 400/77; 364/518
[58] Field of Search .............. 400/61, 62, 70, 71, 400/77, 76; 364/518, 519; 346/154

[56] References Cited

U.S. PATENT DOCUMENTS

| | | | |
|---|---|---|---|
| 3,828,325 | 8/1974 | Stafford | 364/200 |
| 4,080,649 | 3/1978 | Calle | 364/200 |
| 4,556,959 | 12/1985 | Allen | 400/70 |
| 4,557,615 | 12/1985 | Ueno | 400/54 |
| 4,686,525 | 8/1987 | Nagata | 340/790 |
| 4,694,405 | 9/1987 | Bradbury | 346/154 |
| 4,715,006 | 12/1987 | Nagata | 346/154 |
| 4,754,428 | 6/1988 | Schultz | 400/70 |
| 4,768,164 | 8/1988 | Dreher | 364/519 |
| 4,779,105 | 10/1988 | Thomson | 346/154 |
| 4,860,110 | 8/1989 | Kokubu | 364/519 |
| 4,891,769 | 1/1990 | Tasaki | 364/519 |
| 4,901,249 | 2/1990 | Shiota | 400/121 |
| 4,926,347 | 5/1990 | Uchida | 364/519 |

FOREIGN PATENT DOCUMENTS

| | | | |
|---|---|---|---|
| 60-220420 | 11/1985 | Japan | 400/70 |
| 61-154973 | 7/1986 | Japan | 400/70 |

Primary Examiner—David A. Wiecking
Assistant Examiner—Steven S. Kelley
Attorney, Agent, or Firm—Kane, Dalsimer, Sullivan, Kurucz, Levy, Eisele and Richard

[57] ABSTRACT

A printing apparatus for carrying out printing in accordance with a selected one of a plurality of operation modes having their respective control code systems different from each other. Printing information including control codes is inputted from an external instrument into a memory device and is stored therein. The control codes are detected from the printing information stored in the memory device. It is judged with which one of the control code systems the detected control codes are compatible, to select one of the operation modes corresponding to the control code system judged to be compatible.

4 Claims, 3 Drawing Sheets

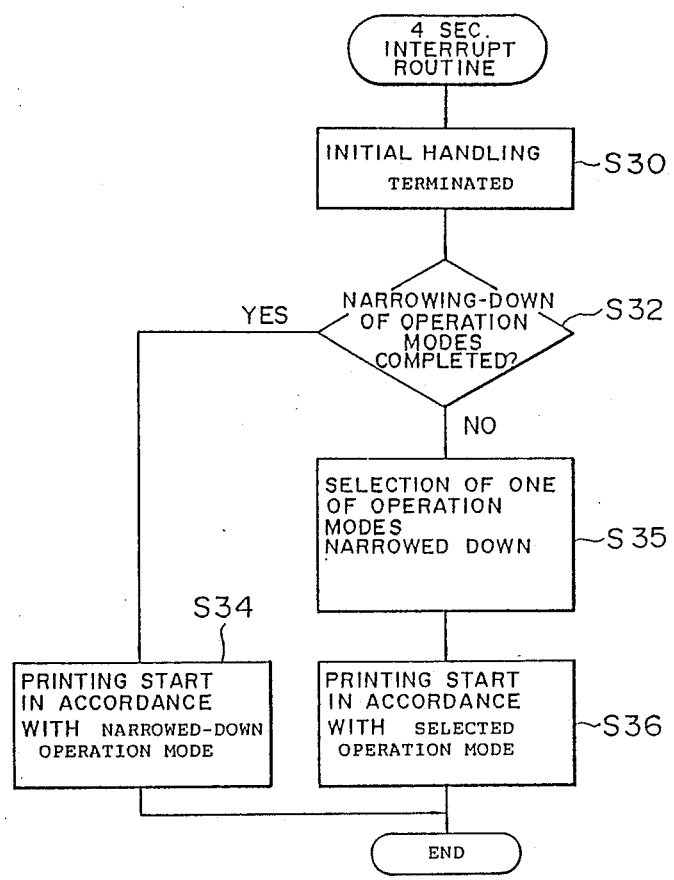

PRINTING APPARATUS THAT ADAPTS TO HOST COMPUTER'S OPERATION MODE

This a continuation of co-pending application Ser. No. 163,610 filed on Mar. 3, 1988 now abandoned.

BACKGROUND OF THE INVENTION

This invention relates to a printing apparatus for carrying out printing in accordance with a selected one of a plurality of operation modes having their respective control code systems different from each other.

Various kinds of printing apparatuses have been offered, in which when printing is carried out based on printing information inputted from an external instrument, letters, figures and the like commanded to be printed are printed in accordance with control codes such as boldface, subscript, line feed, form feed and the like, contained in the printing information. In addition, in order to enable more variegated printing, the printing apparatuses have their respective peculiar operation modes such as a high-speed mode carrying out printing at high speed, switching mode between lateral writing and vertical writing, designation of dot space and bit image and the like. These modes are also designated by the control codes, in particular, escape control codes (ESC sequence) in the printing information.

Thus, in preparation of printing information, it is required for an operator to beforehand understand the operation mode of the printing apparatus by which printing is carried out, and to code the printing information in compliance with the operation mode. The printing apparatus cannot carry out desirable printing, so long as the printing information is not in compliance with the operation mode of the printing apparatus to be used.

For instance, in DIABLO MODE, "ESC 6" is a control code for BACKWARD-PRINT-MODE-ON, while the same is a control command code for PRINTABLE-CODE-AREA-EXPANSION in EPSON MODE, or for SELECT-INTERNATIONAL-CHARACTER-SET in IBM MODE.

In view of the above, a printing apparatus has been developed in which a plurality of operation modes are beforehand provided in the printing apparatus, and inputted printing information is printed in accordance with one of the operating modes which is selected by an operator. Such printing apparatus has widely been employed in various fields, because it is possible to effectively utilize printing information property which has conventionally been accumulated.

However, the above-described printing apparatus is less than perfect. Specifically, in selection of one of the operation modes, it is required for the operator to judge with which one of the operation modes the printing information desired to be printed is compatible. Further, the operator is also compelled to preset dip switches of the printing apparatus on the basis of the judgement, or to mount on the printing apparatus a ROM (read only memory) cartridge, an IC (integrated cirucuit) card or the like having stored therein the desired operation mode. Thus, the printing apparatus is troublesome in operation, through wide in use. Even knowledge concerning hardware of the printing apparatus is required for the operator in order to understand the operation of the printing apparatus. In addition, the printing apparatus is also complicated in setting.

SUMMARY OF THE INVENTION

It is therefore an object of the invention to provide an improved printing apparatus capable of carrying out printing in accordance with a selected one of a plurality of operation modes, wherein an operator's troublesome operation regarding setting of the operation modes can be dispensed with and it is possible to eliminate an error in the setting.

According to the invention, there is provided a printing apparatus for carrying out printing in accordance with a selected one of a plurality of operation modes having their respective control code systems different from each other, which comprises:
  memory means for storing therein printing information inputted from an external instrument, the printing information includng control codes;
  detecting means for detecting the control codes from the printing information stored in the memory means; and
  judging means for judging with which one of the control code systems the control codes detected by the detecting means are compatible, to select one of the operation modes corresponding to the control code system judged to be compatible.

BRIEF DESCRIPTION OF THE ACCOMPANYING DRAWINGS

FIG. 3 is a flow chart of a 4 sec. interrupt routine carried out by the controller.

DESCRIPTION OF THE EMBODIMENTS

Figure 1:
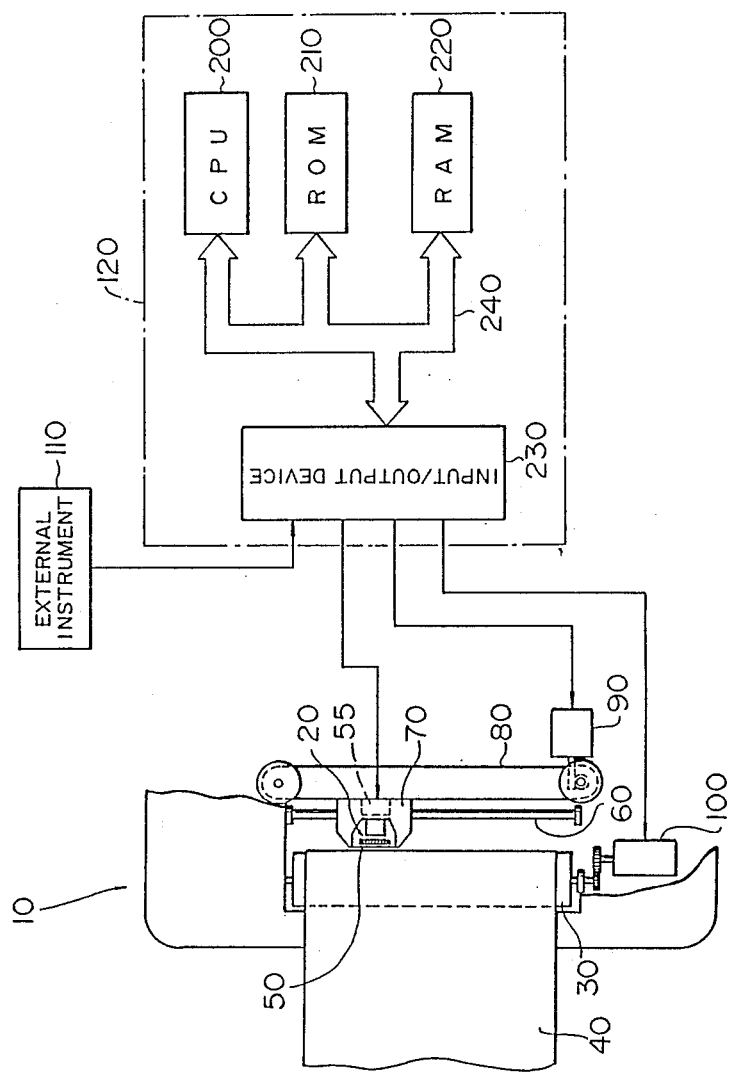
FIG. 1 is a diagrammatic fragmental view of an arrangement of a printing apparatus according to an embodiment of the invention.

Referring to FIG. 1, there is shown a printing apparatus embodying the invention, which is generally designated by the reference numeral 10. The printing apparatus 10 is designed to carry out printing in accordance with a selected one of a plurality of operation modes having their respective control code systems different from each other.

The printing apparatus 10 comprises a printing head 20 composed of a daisy wheel and a print hammer. The printing head 20 is arranged in facing relation to a platen 30 for carrying out printing onto a sheet 40 set on the platen 30. The printing head 20 as well as an ink ribbon cassette 50 is mounted on a carriage 70 which is supported on a guide shaft 60 for sliding movement therealong. The print hammer of the printing head 20 is driven by a stepping motor 55 so that the print hammer impacts against a selected one of characters carried on the daisy wheel. A timing belt 80 is fixedly connected to the carriage 70. The carriage 70 is driven by a carriage stepping motor 90 through the timing belt 80 to move the printing head 20 to a predetermined position along the longitudinal axis of the platen 30. The platen 30 is drivingly connected to a line-feed stepping motor 100 through a gear train. The platen 30 is driven by the stepping motor 100 to feed the sheet 40 by a predetermined amount.

An electronic controller 120 comprises a CPU (central processing unit) 200, a ROM (read only memory) 210 and a RAM (random access memory) 220. The above-mentioned plurality of operation modes are stored in the ROM 210. The electronic controller 120 further comprises an input/output device 230 to which connected are an external instrument 110 such as a host computer, and the above-mentioned various stepping motors 55, 90 and 100. The input/ouput device 230 is connected to the CPU 200, the ROM 210 and the RAM 220 through a common bus 240.

In the printing apparatus 10 arranged as described above, printing information from the external instrument 110 is analyzed by the electronic controller 120 to control the above-mentioned stepping motors 55, 90 and 100 and the printing head 20. That is, operation of the character selection stepping motor 55 is controlled in response to the results of analysis of print commands. Operation of the carriage stepping motor 90 is controlled in response to the results of analysis of carriage commands. Operation of the line-feed stepping motor 100 is controlled in response to the results of analysis of line-feed commands.

Figure 2:
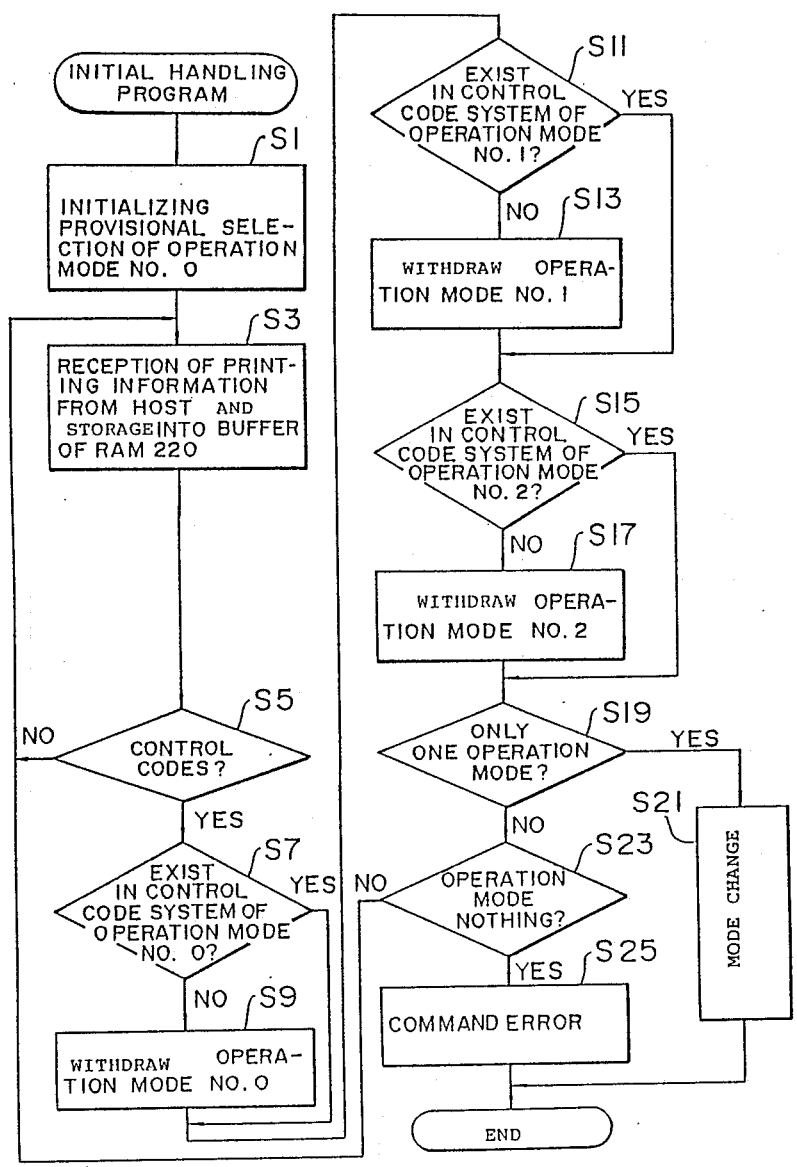
FIG. 2 is a flow chart of an initial handling program carried out by an electronic controller incorporated in the printing apparatus illustrated in FIG. 1.

As described above, the arrangement of the printing apparatus 10 is such that the printing information from the external instrument 110 is analyzed by the electronic controller 120 to carry out control of the printing. In the printing apparatus 10, however, a peculiar initial handling is carried out prior to the printing control. The initial handling will be described with reference to FIG. 2 which shows a flow chart of the initial handling program stored in the ROM 210 of the electronic controller 120.

The initial handling program is initiated by the CPU 200 at the start-up when a power source of the printing apparatus is turned on. An initializing handling is first effected to initialize the printing apparatus at a step S1 where a self test is performed, the RAM 220 is initialized, and an operation mode No. 0 is provisionally selected from the three operation mode Nos. 0, 1 and 2 stored in the ROM 210. At a subsequent step S3, the printing information outputted from the external instrument 110 and including control codes is received by the CPU 200, and is stored in a printing information buffer assigned at a predetermined address of the RAM 220. At a step S5, it is judged whether or not the control codes are contained in the printing information stored in the RAM 220. If the judgement at the step S5 indicates "YES", the program process to subsequent judging steps S7 through S25. If the judgement at the step S5 indicates "NO", the program is again returned to the step S3, and further printing information from the external instrument 110 is stored in the RAM 220.

As the program proceeds to the judging steps, the control codes contained in the printing information stored in the RAM 220 are analyzed by the CPU 200. The analysis includes judgements regarding apparance of the control codes peculiar to the respective operation modes, frequency in appearance of the control codes, or the order of appearance of the control codes, or any conbination thereof. In the illustrated embodiment, it is first judged at the step S7 whether or not the detected control codes exist in the control code system of the operation mode no. 0. If the judgement at the step S7 indicates "NO", the operation mode No. 0 is withdrawn at the step S9 from the candidates of the operation modes. The program proceeds to the subsequent step S11 where it is judged whether or not the detected control codes exist in the control code system of the operation mode No. 1. If the judgement at the step S11 indicates "NO", the operation mode No. 1 is withdrawn at the step S13 from the candidate of the operation modes. The program proceeds to the subsequent step S15 where it is judged whether or not the detected control codes exist in the control code system of the operation mode No. 2. If the judgement at the step S15 indicates "NO", the operation mode No. 2 is withdrawn at the step S17 from the candidates of the operation modes. In the manner described above, it is successively judged in which of the control code systems the detected control codes exist, to narrow the operation modes down to one.

For instance, assume that the operation mode Nos. 1 through 3 are EPSON, IBM and DIABLO MODES, respectively, if a command code "ESC RS(n)" is found in the printing information, which is a control code peculiar to DIABLO (operation mode No. 1) for SET VERTICAL-MOTION-INDEX-TO-(n-1), the judgements at the steps S7 and S11 result in "NO" and the operation mode Nos. 0 and 1 are withdrawn from the candidates.

On the other hand, if "ESC 2" is found in the printing information, the judgement at the step S15 result in "NO", and the operation mode No. 2 (DIABLO) is withdrawn from the candidates, since it does not exist in DIABLO. However, "ESC 2" exists both in EPSON and IBM. In EPSON, it is a control code for SELECT 1/6-INCH-LINE-SPACING, while it is for SELECT-PROGRAMMABLE-LINE-SPACING in IBM. Accordingly, the judgements at the steps S7 and S11 become "YES", the candidate can not be narrowed down to one. Then, however, if "ESC t" is, for instance, found in the printing information during repeated searchings, the judgement at the step S11 becomes "NO" since IBM does not have the above control code. Thus, the candidates are narrowed down to one, i.e., the operation mode No. 1 (ESPON).

At the subsequent step S19, it is judged whether or not the read-out operation modes are narrowed down to one. If the judgement at the step S19 indicates that the operation modes are narrowed down to one, the program proceeds to the step S21 where the operation mode is changed to the narrowed-down one. Thus, the program comes to an end. On the other hand, if the judgement at the step S19 does not indicate that the operation modes are narrowed down to one, the program proceeds to the step S23 where it is judged whether there is no operation mode having its control code system with which the detected control codes are compatible. If the judgement at the step S23 indicates "YES", it is judged to be abnormal, and a command error is displayed at the step S25. Thus, the program comes to an end. On the other hand, if the judgement at the step S23 indicates "NO", i.e., that the operation modes narrowed down are two or more, the program is returned to the step S3 to repeat the reception of the printing information from the external instrument 110, the detection of the control codes, and the narrowing-down of the operation modes.

During the start-up period of the printing apparatus for which the above-described initial handling continues to be repeated, the CPU 200 monitors a time counter incorporated therein to determine the elapsed time. After the elapse of 4 seconds from the start-up, the CPU 200 initiates a 4 sec. interrupt routine handling as shown in FIG. 3. As the 4 sec. interrupt routine is initiated, the above-mentioned initial handling program is terminated at a step S30. Subsequently, it is judged at a step S32 whether or not execution of the initial handling program results in success of narrowing the operation modes down to one. If the judgement at the step S32 indicates "YES", the program proceeds to a step S34 where printing controlled under the printing information stored in the RAM 220 is started in accordance with the control code system of the narrowed-down operation mode. Thereafter, the usual printing control is carried out. On the other hand, if the judgement at the step S32 indicates "NO", i.e., that the narrowed-down operation modes are two or more, the program proceeds to a step S35 where any one of the narrowed-down operation modes is selected. At a subsequent step S36, printing controlled under the printing information stored in the RAM 220 is started in accordance with the control code system of the operation mode selected at a step S35.

It is possible for the printing apparatus constructed as described above to effectively utilize the conventional printing information property, because the printing apparatus is provided with the three operation mode Nos. 0, 1 and 2. In addition, any no troublesome operation is required for an operator to set the operation modes of the printing apparatus. That is, the printing apparatus automatically analyzes the control codes contained in the printing informatiom inputted from the external instrument 110, to judge with which one of the control code systems of the respective operation modes the printing should be carried out in accordance. Thus, there is provided the printing apparatus which is wide in use and in which no knowledge of the complicated hardware is required for an operator and any error in setting can be eliminated.

Moreover, even if the operation modes cannot be narrowed down to a specific one, printing is carried out in accordance with any one selected from the operation modes narrowed down as far as possible, thereby preventing printing from being not started. This does not cause any inconvenience, because the reason why the operation modes cannot be narrowed down to a specific one is that the control codes peculiar to the specific operation mode are not contained in the inputted printing information. Accordingly, desirable printing can be achieved even if the printing is carried out in accordance with any one selected from the narrowed-down operation modes.

As described above, the printing apparatus according to the invention can carry out printing in accordance with a selected one of a plurality of operation modes. Thus, it is possible for the printing apparatus to effectively utilize the conventional printing information property. In addition, in the printing apparatus, no knowledge of the complicated hardware is required for an operator to set the operation modes, and it is possible to eliminate an error in the setting.

What is claimed is:

1. A printing apparatus comprising:
   first memory means ford storing a plurality of sets of control codes, each set of control codes corresponding to an operation mode used by one of a plurality of specific external instruments;
   second memory means for storing printing data including control codes inputted from an external instrument, which control codes may or may not be one of said plurality of sets of control codes;
   detecting means for detecting the control codes from the printing data stored in the second memory means;
   judging means for judging which one of said plurality of sets of control codes is most compatible with the control codes detected by the detecting means; and
   means for causing the printing apparatus to conduct printing using the set of control codes which has been judged most compatible by said judging means.

2. The printing apparatus according to claim 1, wherein said judging means includes narrowing-down means for successively judging in which of said sets of control code the control codes detected by said detecting means exist, for narrowing said operation modes down to one.

3. The printing apparatus according to claim 1, which further comprises interrupting means for interrupting the operation of said judging means upon passage of a predetermined time.

4. The printing apparatus according to claim 2, which further comprises interrupting means for interrupting the operation of said judging means upon passage of a predetermined time, and selecting means for selecting any one of the narrowed-down operation modes if said judging means failed to narrow the operation modes down to one within said predetermined time.

* * * * *